United States Patent [19]
Naito

[11] Patent Number: 4,956,778
[45] Date of Patent: Sep. 11, 1990

[54] CONSTANT SPEED HOLDING DEVICE

[75] Inventor: Yasuo Naito, Hyogo, Japan

[73] Assignee: Mitsubishi Denki Kabushiki Kaisha, Tokyo, Japan

[21] Appl. No.: 213,856

[22] Filed: Jun. 30, 1988

[30] Foreign Application Priority Data

Jul. 2, 1987 [JP] Japan ................. 62-167173

[51] Int. Cl.⁵ ............................................. B60K 31/04
[52] U.S. Cl. ............................. 364/426.04; 180/179; 123/352
[58] Field of Search ............ 364/426.04, 426.01, 364/424.01; 123/352, 351; 180/170, 176, 179; 324/160–162

[56] References Cited

U.S. PATENT DOCUMENTS

| | | | |
|---|---|---|---|
| 4,451,888 | 5/1984 | Kuno et al. ................. | 364/426.04 |
| 4,467,428 | 8/1984 | Caldwell ..................... | 364/426.04 |
| 4,591,986 | 5/1986 | Nakajima et al. ........... | 364/426.04 |
| 4,597,049 | 6/1986 | Murakami .................. | 364/431.07 |
| 4,598,370 | 7/1986 | Nakajima et al. ........... | 364/426.04 |
| 4,725,969 | 2/1988 | Onogi et al. ................ | 364/565 |

*Primary Examiner*—Thomas G. Black
*Attorney, Agent, or Firm*—Sughrue, Mion, Zinn, Macpeak & Seas

[57] ABSTRACT

A constant speed holding device for a vehicle includes a running speed detector, an aimed speed setting unit, a speed deviation calculating unit for calculating a speed deviation, an acceleration calculating unit, a first pulse width calculating unit responsive to a speed deviation signal from the speed deviation calculating unit and an acceleration signal from the acceleration calculating unit for calculating a pulse width of a first pulse signal having a predetermined period, an acceleration memory unit for storing a value of the acceleration signal in the past, an aimed acceleration generating unit responsive to an output of said acceleration memory for generating a desired aimed acceleration, an acceleration deviation calculating unit responsive to the aimed acceleration signal and the acceleration signal for calculating an acceleration deviation, a second pulse width calculating unit responsive to the acceleration deviation signal for calculating a pulse width of a second pulse signal having a predetermined period, an output pulse selection unit for selecting either the first or the second pulse signals, whichever is suitable, and an actuator responsive to a selected output pulse signal for on-off controlling a throttle valve of an engine of the vehicle based on the pulse width thereof.

4 Claims, 3 Drawing Sheets

4,956,778

CONSTANT SPEED HOLDING DEVICE

BACKGROUND OF THE INVENTION

The present invention relates to a constant speed holding device for allowing a vehicle to run automatically at a constant speed.

In recent years, it has become popular to equip automobiles with a constant speed holding device for automatically controlling a running speed of the automobile at a constant value preset under normal running conditions.

An example of such a device is shown in Japanese Patent Application Laid-open No. 98636/1983, in which a desired speed is set when it is attained, and the set value is used as an aimed speed subsequently. That is, a signal corresponding to a deviation between an actual running speed and the aimed speed is obtained, and, after a predetermined gain is given to the deviation signal, it is operated with an acceleration signal having a predetermined gain given thereto to provide a signal to an actuator of a throttle of an engine of the automobile to make the actual running speed closer to the aimed speed. The device further has a function of allowing the constant speed of the automobile to be recovered after the constant running speed is cancelled temporarily.

In the conventional device mentioned above, however, the recovery of the aimed speed must be done by accelerating the automobile under an acceleration control such that an acceleration becomes a predetermined value. As is well known, an actual acceleration during uphill running, for example, is smaller than the predetermined acceleration, and therefore a throttle is opened to a value beyond a value necessary to attain the desired acceleration during normal running. Consequently, it takes a long time to close the throttle to the necessary value by an actuator thereof, resulting in a problem of over compensating for the acceleration.

SUMMARY OF THE INVENTION

An object of the present invention is to provide a constant speed holding device in which a throttle is prevented from being opened two much, and to thereby minimize the problem of over compensating for acceleration.

According to the present invention, the above object can be achieved by constituting a constant speed holding device with a running speed detector for measuring an actual speed of a vehicle. An aimed speed setting unit sets a speed desired by an operator. A speed deviation calculating unit is responsive to an actual running speed signal from the running speed detector and a set speed signal from the aimed speed setting unit for calculating a speed deviation therebetween. An acceleration calculating unit is responsive to the running speed signal for calculating an acceleration of the vehicle. A first pulse width calculating unit is responsive to a speed deviation signal from the speed deviation calculating unit and an acceleration signal from the acceleration calculating unit for calculating a pulse width of a first pulse signal having a predetermined period. An acceleration memory unit stores a value of the acceleration signal at a past time. An aimed acceleration generating unit is responsive to an output of the acceleration memory unit for generating a desired aimed acceleration. An acceleration deviation calculating unit is responsive to the aimed acceleration signal and the acceleration signal for calculating an acceleration deviation. A second pulse width calculating unit is responsive to the acceleration deviation signal for calculating a pulse width of a second pulse signal having a predetermined period. A output pulse selection unit selects either one of the first or second pulse signals whichever is suitable. An actuator is responsive to a selected output pulse signal for on-off controlling a throttle valve of an engine of the vehicle on the basis of the pulse width thereof.

In the present invention, the output pulse selection unit selects either one of the first or the second pulse signals, whichever is souitable, from the respective first and second pulse width calculating unit, and the throttle valve is on-off controlled correspondingly to the pulse width of the selected output pulse signal. Therefore, the aimed acceleration is variable according to an actual acceleration of the vehicle, so that a convergency of automatic acceleration return control is improved.

DETAILED DESCRIPTION OF THE PREFERRED EMBODIMENT

Figure 1:
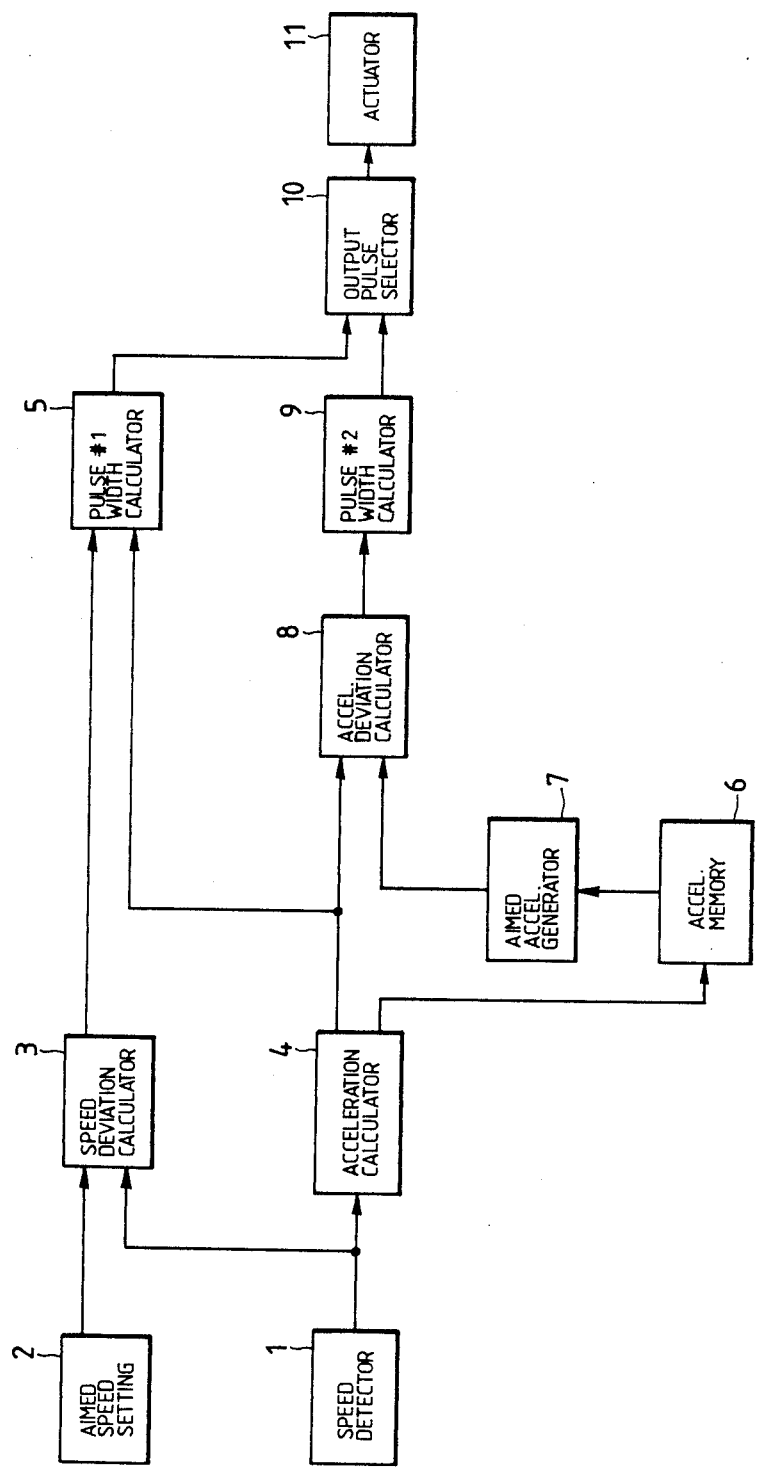
FIG. 1 is a block diagram of an embodiment of the present invention.

An embodiment of the present device will be described with reference to FIGS. 1 through 4.

In these figures, a running speed detector 1 detects an actual running speed of a vehicle. An operator operates an aimed speed setting unit 2 to set a desired vehicle speed. A speed deviation calculating unit 3 is responsive to a set speed signal from the aimed speed setting unit 2 and a running speed signal from the running speed detecting unit 1 to calculate a deviation of actual speed from the aimed speed. An acceleration calculating unit 4 is responsive to the running speed signal from the running speed detector 1 to calculate vehicle acceleration. A first pulse width calculating unit 5 is responsive to the deviation signal from the speed deviation calculating unit 3 and an acceleration signal from the acceleration calculating unit 4 to calculate a pulse width of a first pulse signal having a predetermined period.

An acceleration memory unit 6 stores values of the acceleration signal from the acceleration calculating unit 4 for a predetermined time period. An aimed acceleration generating unit 7 is responsive to an output of the acceleration memory 6 to produce a desired aimed acceleration. An acceleration deviation calculating unit 8 is responsive to the aimed acceleration signal and the actual acceleration signal to calculate a deviation therebetween.

A second pulse width calculating unit 9 calculates a pulse width of a second pulse signal having a predetermined period according to the acceleration deviation signal from the calculating unit 8. An output pulse selection unit 10 selects a suitable output pulse on the basis of the first and second pulse signals from the first and second pulse width calculating units 5 and 9. An actuator 11 on-off controls a throttle valve of an engine carburetor in correspondence with the pulse width of the selected output pulse, so as to control engine output.

Figure 2:
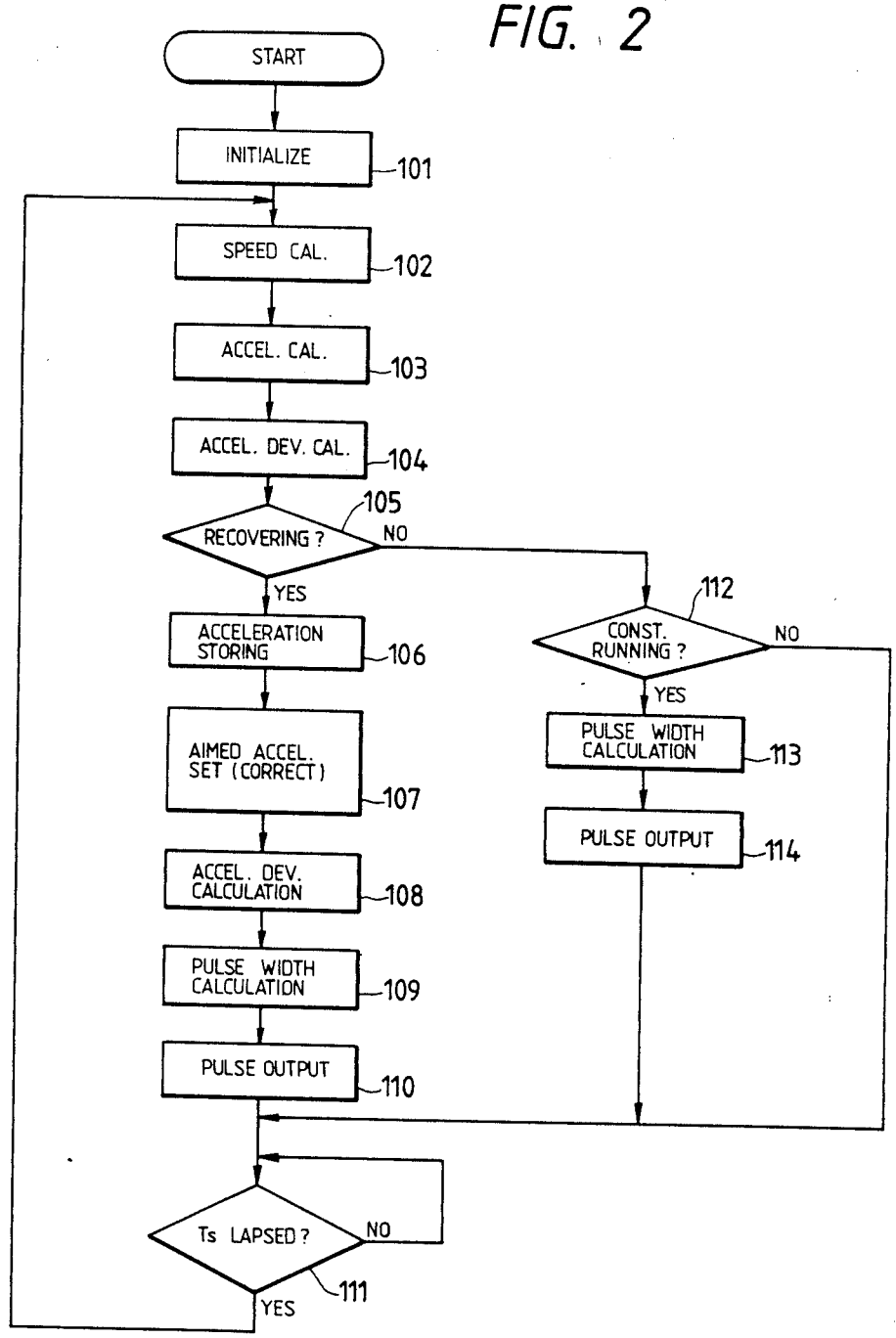
FIG. 2 is a flow chart showing an operation of the device shown in FIG. 1.
Figure 3:
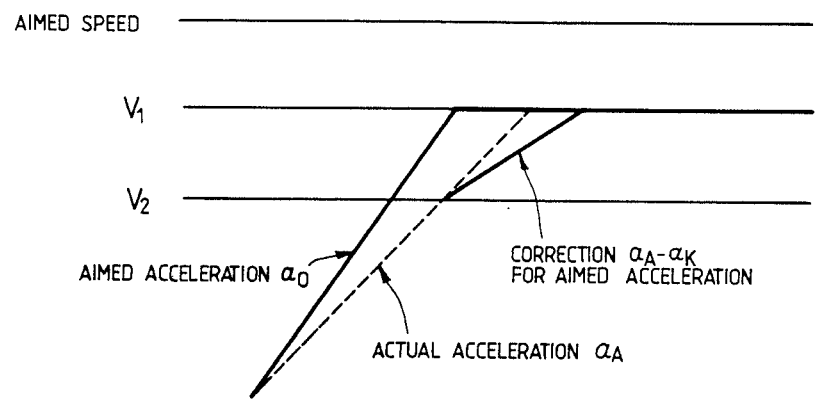
FIG. 3 is an illustration for explaining the principle of aimed acceleration correction.
Figure 4:
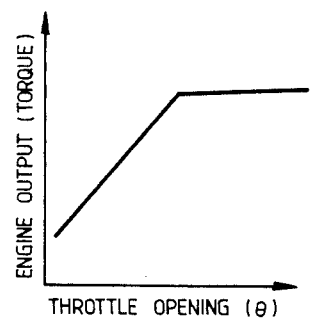
FIG. 4 is a graph showing a relation between a throttle opening and an engine output.

An operation of the present device constructed as above with be described with reference to a flow chart shown in FIG. 2.

When a power source is connected, a microcomputer starts to perform step 101 of initializing its respective ports and memories thereof. Then, in step 102, a running speed $v_n$ is calculated according to the period of a vehicle speed pulse stored in a vehicle interrupt routine (not shown). It should be noted that the steps subsequent to step 101 constitute a loop circulated at every predetermined time $T_s$, and managed by step 111, which is an idle step. In step 103, an acceleration $\alpha$ of the vehicle is calculated according to the following equation:

$$\alpha = (v_n - V_{n-1})/T_s$$

where $v_{n=1}$ is a running speed at a preceding sampling time. In step 102, a speed deviation is calculated based on the running speed $v_n$ and the aimed speed.

In step 105, it is determined whether or not the speed is being recovered. If it is being recovered, the operation is shifted to step 106 in which accelerations calculated in step 103 are stored sequentially.

In step 107, the aimed acceleration is corrected according to the past accelerations. The principle of this correction will be described with reference to FIG. 3. A recovery control is started according to the recovery instruction so that the actual acceleration becomes coincident with the predetermined aimed acceleration $\alpha_0$. The aimed acceleration $\alpha_0$ is used up to the predetermined value $V_1$ Km/h below aimed speed. On the other hand, at a time when the actual speed reaches a value $V_2$ Km/h which is below the value $V_1$ Km/h an average value $\alpha_A$ of the actual acceleration is compared with the aimed acceleration $\alpha_0$. When $\alpha_A < \alpha_0$, the aimed acceleration thereafter is set to a smaller value $\alpha_A - \alpha_K$ so that actual acceleration is controlled to be $\alpha_A - \alpha_K$ unitl the speed $V_1$ Km/h is achieved. When $\alpha_A \geq \alpha_0$, no correction of acceleration is performed because the engine output becomes constant when the throttle opening is beyond a predetermined value.

In step 108, the acceleration deviation $\alpha - \alpha_0$ is calculated according to the aimed acceleration set in step 107, and the acceleration calculated in step 103. In step 109, a control amount necessary to approximate the acceleration to the aimed value, is calculated on the basis of acceleration deviation and, in step 110, it is supplied to the actuator 11.

When the decision made in step 105 is negative, the operation is shifted to step 112, in which it is decided whether the vehicle is running at a constant speed. If the vehicle is running at a constant speed, operation is shifted to step 111. If the vehicle is not running at a constant speed, operation is shifted to step 113, wherein a correction amount necessary to correct the speed is calculated on the basis of the speed deviation and the acceleration, etc., and the output is provided in step 114.

In step 111, it is decided whether or not a predetermined time lapses. If a predetermined time has elapsed, the operation is returned to step 102. If a predetermined time has not elapsed, the operation is made idle in the same step.

Therefore, it is possible to prevent the throttle valve from being opened too much during the time when the vehicle speed is being recovered, by correcting the aimed acceleration $\alpha_0$ according to the actual acceleration, $\alpha_0 = (V_{n-1})/T_s$, thereby to prevent to much compensation for the acceleration.

What is claimed is:

1. A constant speed holding device for a vehicle, said device enabling said vehicle to recover to a constant speed, said device comprising:
    a running speed detector for measuring an actual speed of a vehicle.
    an aimed speed setting means for setting a speed desired by an operator;
    a speed deviation calculating means responsive to an actual running speed signal from said running speed detector and a set speed signal from said aimed speed setting means for calculating a speed deviation therebetween;
    an acceleration calculating means responsive to the running speed signal for calculating an acceleration of the vehicle;
    a first pulse width calculating means responsive to a speed deviation signal from said speed deviation calculating means and an acceleration signal from said acceleration calculating means for calculating a pulse width of a first pulse signal having a predetermined period;
    an acceleration memory means for storing a value of the acceleration signal in the past;
    an aimed acceleration generating means responsive to an output of said acceleration memory means for generating an aimed acceleration $\alpha_0$;
    an acceleration deviation calculating means responsive to the aimed acceleration signal and the acceleration signal for calculating an amount of acceleration deviation and outputting an acceleration deviation signal accordingly;
    a second pulse width calculating means responsive to the acceleration deviation signal for calculating a pulse width of a second pulse signal having a predetermined period;
    an output pulse selection means for selecting said first pulse signal when said vehicle is not recovering to said constant speed, or said second pulse signal, when the vehicle is recovering to said constant speed; and
    an actuator responsive to a selected output pulse signal for on-off controlling a throttle valve of an engine of the vehicle on the basis of the pulse width thereof.

2. A constant speed holding device as defined in claim 1, wherein said aimed acceleration $\alpha_0$ is used up to a predetermined speed value $V_1$ below said aimed speed, and when said actual speed reaches a value $V_2$ which is below $V_1$, an average value $\alpha_A$ of said actual acceleration is compared with said aimed acceleration $\alpha_O$.

3. A constant speed holding device as defined in claim 2, wherein when an average value $\alpha_A$ of said actual acceleration is less than said aimed acceleration $\alpha_0$, said aimed acceleration $\alpha_0$ is set to a smaller value $\alpha_A - \alpha_K$, so that said actual acceleration is controlled to be $\alpha_A - \alpha_K$ unitl speed $V_1$ is achieved.

4. A constant speed holding device as defined in claim 3, wherein when said average value $\alpha_A$ of said actual acceleration is greater than $\alpha_0$, said aimed acceleration $\alpha_0$ is unchanged.

* * * * *